US009739598B2

United States Patent
Joerger et al.

(10) Patent No.: US 9,739,598 B2
(45) Date of Patent: Aug. 22, 2017

(54) DEVICE FOR INTERFERENTIAL DISTANCE MEASUREMENT

(71) Applicant: DR. JOHANNES HEIDENHAIN GMBH, Traunreut (DE)

(72) Inventors: Ralph Joerger, Traunstein (DE); Walter Huber, Traunstein (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 126 days.

(21) Appl. No.: 14/784,518

(22) PCT Filed: Mar. 11, 2014

(86) PCT No.: PCT/EP2014/054701
§ 371 (c)(1),
(2) Date: Oct. 14, 2015

(87) PCT Pub. No.: WO2014/170066
PCT Pub. Date: Oct. 23, 2014

(65) Prior Publication Data
US 2016/0061587 A1    Mar. 3, 2016

(30) Foreign Application Priority Data
Apr. 15, 2013   (DE) .................. 10 2013 206 693

(51) Int. Cl.
*G01B 9/02* (2006.01)
*G01B 11/14* (2006.01)
*G01B 11/02* (2006.01)

(52) U.S. Cl.
CPC .......... *G01B 11/14* (2013.01); *G01B 9/02018* (2013.01); *G01B 9/02035* (2013.01);
(Continued)

(58) Field of Classification Search
CPC ..................... G01B 9/02097; G01B 2290/30
(Continued)

(56) References Cited

U.S. PATENT DOCUMENTS 5,517,307 A     5/1996  Buehring et al.
6,535,290 B1 *  3/2003  Spanner ............ G01B 9/02029
                                                       356/496
(Continued)

FOREIGN PATENT DOCUMENTS

DE          90 01 154      4/1990
DE       10 2007 016 774   10/2008
DE       10 2011 005 937    9/2012

OTHER PUBLICATIONS

International Search Report, dated Jul. 28, 2014, issued in corresponding International Application No. PCT/EP2014/054701.

*Primary Examiner* — Jonathan Hansen
(74) *Attorney, Agent, or Firm* — Andrews Kurth Kenyon LLP

(57) ABSTRACT

A device for interferential distance measurement between two objects that are situated in a movable manner with respect to each other along at least one shifting direction includes at least one light source as well as at least one splitting element, which splits a beam of rays emitted by the light source at a splitting location into at least two partial beams that propagate onward at different angles. The device furthermore includes at least one deflecting element that effects a deflection of the incident partial beams in the direction of a merging location, where the split partial beams are superimposed in an interfering manner and the optical paths of the partial beams of rays between the splitting location and the merging location being arranged such that the traversed optical path lengths of the partial beams between the splitting location and the merging location are identical in the event of a change of distance between the (Continued)

two objects. Furthermore, at least one detector system is provided for detecting distance-dependent signals from the superimposed pair of interfering partial beams.

14 Claims, 11 Drawing Sheets

(52) U.S. Cl.
CPC ..... *G01B 9/02058* (2013.01); *G01B 9/02061* (2013.01); *G01B 9/02097* (2013.01); *G01B 11/026* (2013.01); *G01B 2290/30* (2013.01)

(58) Field of Classification Search
USPC .......................................................... 356/498
See application file for complete search history.

(56) References Cited

U.S. PATENT DOCUMENTS

| | | | |
|---|---|---|---|
| 8,797,546 B2 | 8/2014 | Huber et al. | |
| 2006/0262315 A1* | 11/2006 | Spanner | G01D 5/26 356/450 |
| 2011/0249270 A1* | 10/2011 | Ishizuka | G01D 5/266 356/486 |
| 2012/0242994 A1 | 9/2012 | Huber et al. | |

* cited by examiner

DEVICE FOR INTERFERENTIAL DISTANCE MEASUREMENT

FIELD OF THE INVENTION

The present invention relates to a device for interferential distance measurement.

BACKGROUND INFORMATION

In addition to detecting position changes of two objects that are movable with respect to each other in one or two lateral directions, there are measuring tasks in which it is exclusively or possibly additionally necessary to determine the distance between these objects in a vertical measuring direction that is perpendicular thereto. Interferential methods lend themselves to a highly precise distance measurement along such a measuring direction, as disclosed, for example, in German Published Patent Application No. 10 2007 016 774 or German Published Patent Application No. 10 2011 005 937.

In these interferential distance measurements, a beam of rays is split into two partial beams via suitable diffractive or refractive optical elements, that is, into a measuring beam and a reference beam. Subsequently these pass through associated measurement and reference arms and are brought into an interfering superimposition at a merging location. The distance to be measured is encoded via the phase difference between the measuring beam and the reference beam. In the event that there exists a difference of path length between the measuring beam and the reference beam, there results a dependence of the distance to be measured on the respective wave length of the individual beams of rays. Fundamentally, however, independence is desired of the interferential distance measurement from possible wave length fluctuations. In the methods from the two abovementioned documents, however, this is only ensured at a specific nominal distance, but not over the entire distance measuring range.

SUMMARY

Example embodiments of the present invention provide a device for highly precise interferential distance measurement, in which the measured distance is independent of the wavelength of the utilized light source over the entire distance measuring range.

The device, according to example embodiments of the present invention, for the interferential measurement of the distance between two object, which are situated in a movable manner with respect to each other along at least one shifting direction, includes at least one light source, at least one splitting element, at least one deflecting element as well as at least one detector system. Via the splitting element, the beam emitted by the light source is split at a splitting location into at least two partial beams, which propagate onward at different angles. The deflecting element effects a deflection of the incident partial beams in the direction of a merging location, where the split partial beams are superimposed in an interfering manner and the optical paths of the partial beams between the splitting location and the merging location are arranged such that the traversed path lengths of the partial beams between the splitting location and the merging location are identical in the event of a change of distance between the two objects. The detector system is able to detect distance-dependent signals from the superimposed pair of interfering partial beams of rays.

It may be provided that
at least one scanning unit is connected with one object, which includes at least one light source, at least one detector system and at least one first deflecting element and
either a measuring reflector or a splitting element is connected with the other object.

It may be provided that the partial beams in the scanning unit propagate at least in a portion of the optical path symmetrically with respect to at least one axis of symmetry of the scanning unit.

It is furthermore possible that
either the scanning unit has two partial scanning units, which are situated in mirror symmetry with respect to a mirror plane, which is oriented parallel to the shifting direction or
in the case of a single utilized scanning unit, this scanning unit is arranged in mirror symmetry with respect to a mirror plane that is oriented parallel to the shifting direction.

The position and/or design of the at least one deflecting element may ensure that the traversed optical path lengths of the partial beams between the splitting location and the merging location are identical in the event of a change of distance between the two objects.

Furthermore, it may be provided that
the splitting element is arranged as a one-dimensional transmission grating and
the scanning unit further includes at least one first measuring standard, which has a two-dimensional transmission cross grating and a reflector situated parallel to it.

In this instance, the transmission cross grating and the reflector may be situated perpendicularly with respect to the transmission grating of the splitting element.

Furthermore, it is possible for the deflecting element to be arranged as a deflecting prism.

The various components may be arranged and situated such that
the beam of rays emitted by the light source is split into two partial beams at the splitting element and the two partial beams propagate in the direction of the scanning unit,
in the scanning unit, the partial beams of rays are deflected by the deflecting element in the direction of the measuring standard,
the partial beams pass through the transmission cross grating of the measuring standard, undergoing a deflection in the process, and then strike the reflector,
a reflection occurs from the reflector back in the direction of the transmission cross grating, where after the repeated traversal of the transmission cross grating another deflection results such that the partial beams propagate in parallel offset with respect to the direction of incidence to the deflecting element,
the partial beams are deflected at the deflecting element in the direction of the merging location and
the superimposed partial beams then propagate in the direction of the detector system.

For this purpose, the scanning unit may include a second deflecting element as well as a second measuring standard, which includes a two-dimensional transmission cross grating and a reflector, the second deflecting element and the second measuring standard being situated in the scanning unit in mirror symmetry with respect to the first deflecting element and to the first measuring standard.

Another example embodiment of the device provides for the scanning unit connected with an object to include
furthermore at least four deflecting elements, which are each arranged as a one-dimensional reflection grating, and at least one splitting element, which is arranged as a one-dimensional transmission grating, and
a measuring reflector to be connected with the other object, which is arranged as a plane reflector.

In this instance, the scanning unit may have a transparent carrier body having a truncated pyramid-shaped cross section, the splitting element being situated on its surface facing the measuring reflector and the at least four deflecting elements being situated on its lateral surfaces.

The various components may be arranged and situated such that
the beam of rays emitted by the light source is split into two partial beams at the splitting element and the two partial beams propagate in the direction of the measuring reflector,
the partial beams are reflected by the measuring reflector back in the direction of the first and second deflecting elements in the scanning unit, where the partial beams are deflected in the direction of the third and fourth deflecting elements and
a deflection of the partial beams to the measuring reflector occurs via the third and fourth deflecting elements,
from the measuring reflector, the partial beams are reflected back in the direction of the merging location in the scanning unit and
the superimposed partial beams then propagate in the direction of the detector system.

Furthermore, there may be a provision in this connection for the deflecting elements situated in the scanning unit additionally to have a focusing effect on the partial beams propagating in the scanning unit such that a line focus results in a center of symmetry of the scanning unit.

Example embodiments of the present invention may achieve an independence of the distance measurement from possible wave length changes over the entire distance measuring range. This results from the fact that the traversed optical path lengths of the interfering partial beams are identical for all distances in the measuring range and in this manner distance-dependent phase differences are produced in the entire measuring range. Possible wavelength fluctuations therefore influence the distance measurement in the device neither in the nominal position nor in a possible tilting of individual components from the nominal position.

With a view to implementing the device as described herein, there are diverse possibilities, which may be suitably chosen depending on the application.

Further features and aspects of example embodiments of the present invention are explained in more detail below with reference to the appended Figures.

DETAILED DESCRIPTION

Before describing below in detail a device for interferential distance measurement, first a few fundamental considerations shall be explained.

Example embodiments of the present invention provide for a distance-dependent phase difference to be produced over the entire distance measuring range that is technically measurable by the device, as the path length differences between the split partial beams compensate each other exactly. Via this phase difference, it is possible to encode and ensure a path length-independent and thus wavelength-independent distance measurement. This principle is explained with reference to the schematic view set forth in FIG. 1, in which for reasons of improved clarity only a portion of the necessary components of the device is illustrated.

Figure 1:
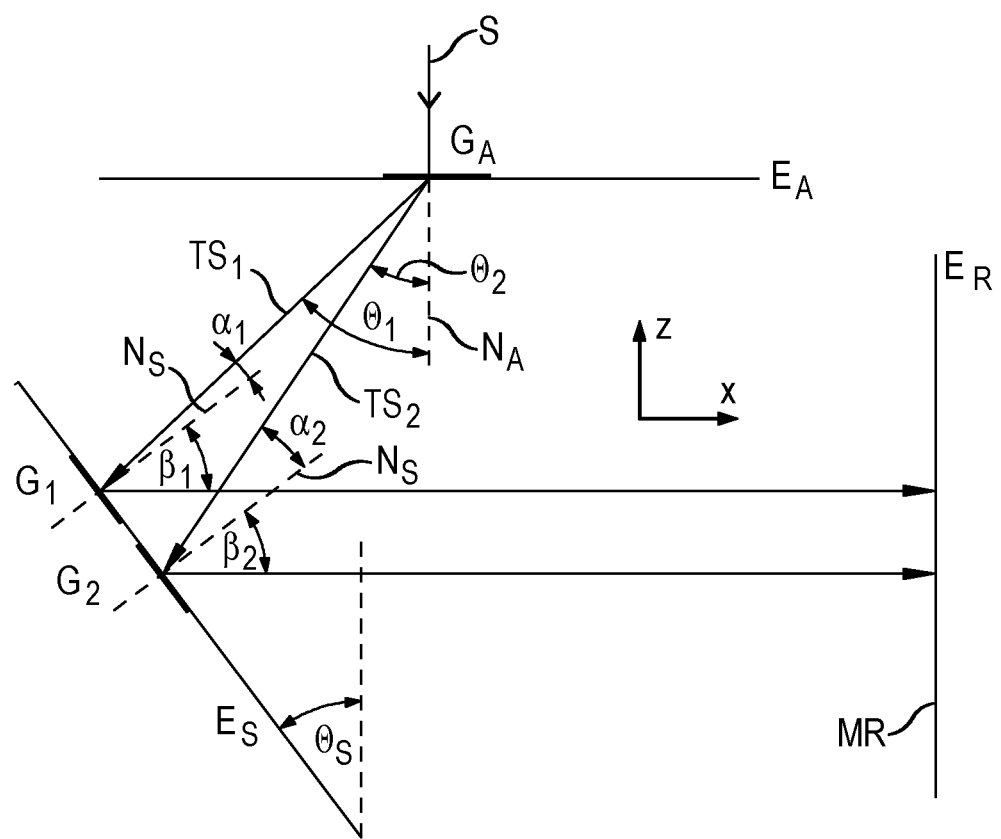
FIG. 1 is a schematic view for explaining fundamental principles of example embodiments of the present invention.

The beam of rays S emitted by a light source strikes a splitting location on the splitting element $G_A$ situated in plane $E_A$ and is split into two partial beams TS1, TS2 in the process. The partial beams then continue to propagate at different angles $\theta_1$, $\theta_2$ with respect to the normal $N_A$ onto plane $E_A$. Both partial beams TS1, TS2 then strike deflecting elements $G_1$, $G_2$ situated in plane $E_S$, via which partial beams TS1, TS2 are deflected in the direction of plane $E_R$. As illustrated in FIG. 1, plane $E_S$ and thus also the deflecting surfaces of deflecting elements $G_1$, $G_2$ are situated so as to be tilted by angle $\theta_S$ with respect to the angle of incidence of beam of rays S. In this instance, reflection gratings that have grating periods $d_1$ and $d_2$ function as deflecting elements $G_1$, $G_2$. With the aid of deflecting element $G_1$ a deflection is effected of partial beam TS1 striking plane $E_S$ at angle $\alpha_1$ with respect to the normal $N_S$ such that partial beam TS1 propagates onward at angle $\beta_1$ with respect to the normal $N_S$ onto plane $E_S$; deflecting element $G_2$ effecting a deflection of partial beam TS2 striking plane $E_S$ at angle $\alpha_2$ such that partial beam TS2 continues to propagate in the direction of plane $E_R$ at angle $\beta_2$ with respect to the normal $N_S$. Angles $\beta_2$ and $\beta_2$, at which partial beams TS1, TS2 propagate away from deflecting elements $G_1$, $G_2$, differ, as illustrated. The desired angles $\theta_1$, $\theta_2$ are set e.g. via a suitable selection of grating periods $d_1$ and $d_2$ of deflecting elements $G_1$, $G_2$. A measuring reflector MR is located in plane $E_R$, which reflects the partial beams TS1, TS2 striking it back counter to the direction of incidence x so that partial beams TS1, TS2, following the repeated deflection via deflecting elements $G_1$, $G_2$, are again superimposed on each other at a merging location in plane $E_A$. In the event of a position change of plane $E_A$ with respect to the remaining components along the z-direction, a distance-dependent interference signal is able to be generated in this manner, which is detectable by a downstream detector system. The path lengths $W_1$, $W_2$ traversed by partial beams TS1, TS2 between planes $E_A$ and $E_R$, i.e. between splitting and recombination, result as pure geometric functions as a function of angles $\theta_1$, $\theta_2$ and $\theta_S$. The wavelength-dependent path length difference $\Delta W = W_1 - W_2$, which is to be eliminated in the device described herein, may thus be set to zero, independently of a change of distance $\Delta z$, by the suitable selection of the angles $\theta_1$, $\theta_2$ and $\theta_S$, i.e., $$\Delta W(\theta_1, \theta_2, \theta_S) = \quad \text{(eq. 1)}$$
$$W_1 - W_2 = f(\Delta z) \left( \frac{(1 + \sin(\theta_1))}{\sin(\theta_S + \theta_1)} - \frac{(1 + \sin(\theta_2))}{\sin(\theta_S + \theta_2)} \right) = 0$$

where:
$\Delta W$:=optical path length difference
$W_1$:=optical path length of the first partial beam
$W_2$:=optical path length of the second partial beam
$\theta_1$:=angle of diffraction of the first partial beam at the splitting element
$\theta_2$:=angle of diffraction of the second partial beam at the splitting element
$\theta_S$:=angle of inclination of plane $E_S$ with respect to measuring direction z Phases P1, P2 of partial beams T1, T2, in contrast, result as functions of the product of the respective z-dependent location of incidence on deflection elements $G_1$ and $G_2$, respectively, and the respective reciprocal grating periods $d_1$ and $d_2$ that are independent from it. The phase difference $\Delta P(\Delta z) = P_1(\Delta z) - P_2(\Delta z)$ resulting in the event of a change of distance $\Delta z$ is therefore generally a function of the change of distance $\Delta z$:

$$\Delta P(\Delta z, \theta_1, \theta_2, \theta_S) = \quad \text{(eq. 2)}$$
$$P_1 - P_2 = 4\pi \Delta z \left( \frac{(m_1 \sin(\theta_1))}{d_1 \sin(\theta_S + \theta_1)} - \frac{(m_2 \sin(\theta_2))}{d_2 \sin(\theta_S + \theta_2)} \right)$$

where:
$\Delta P$:=phase difference between the two partial beams
$P_1$:=phase of the first partial beam at the merging location
$P_2$:=phase of the second partial beam at the merging location
$\theta_1$:=angle of diffraction of the first partial beam at the splitting element
$\theta_2$:=angle of diffraction of the second partial beam at the splitting element
$\theta_S$:=angle of inclination of plane $E_S$ with respect to measuring direction z
$\Delta z$:=relative shift of the components that are movable relative to each other along the measuring direction z
$m_{1/2}$:=order of diffraction of the first and second partial beams at the splitting element By a suitable choice of grating periods $d_1$, $d_2$ of deflecting elements G1, G2 for the defined setting of angles $\theta_1$, $\theta_2$ and the selection of a fitting angle $\theta_S$, it is thus possible to implement a suitable dependence of the change in distance $\Delta z$ on the resulting phase difference $\Delta P(\Delta z)$ and thus a suitable signal period for the distance measurement. At the same time, the secondary condition $\Delta W = 0$ is maintained and thus an independence from possible wavelength fluctuations is ensured.

The above-described principle for achromatic, interferential distance measurement may be implemented in combination with any number of diffractive and/or geometric deflections of partial beams TS1, TS2. In this manner, it is possible to provide devices that, in addition to the desired wavelength independence, are also insensitive to tilting of individual components about specific axes.

Devices according to example embodiments of the present invention for interferential distance measurement are explained in detail below, in which, among other things, a different number of such deflections is provided.

A device according to an example embodiment of the present invention for interferential distance measurement is schematically illustrated in FIGS. 2, 3a, 3b and 4a to 4c in different representations or partial representations.

The device in this instance is used to determine the distance of two objects O1, O2 along the vertical shifting direction z. The objects O1, O2, illustrated schematically in FIG. 2, may be e.g. machine components that are situated movably relative to each other along shifting direction z. Distance-dependent signals about the distance of the two objects O1, O2 are generated via the device hereof. These signals may be processed further by a downstream machine controller. In addition to the distance detection along shifting direction z, a position detection along the orthogonal, horizontal shifting directions x, y may also be provided, along which the two objects O1, O2 are possibly also disposed in a movable manner.

In the present exemplary embodiment, one of the two objects O1 is coupled or connected to a component 10 of the device. The other object O2 is coupled or connected to a scanning unit 20, which includes two partial scanning units 20.1, 20.2, which embrace component 10. Between the two partial scanning units 20.1, 20.2, the component 10, which is connected to the other object O1, is situated in movable fashion relative to scanning unit 20 along shifting direction z. The device allows for a highly precise determination of distance changes between component 10 and scanning unit 20, for example, the determination of $d_z$ indicated in FIG. 2 between upper partial scanning unit 20 and component 10.

Component 10 of the device, which is connected to object O1, includes at least one splitting element 11, which in the present example is arranged as a one-dimensional transmission grating or transmission phase grating, having the splitting period $TP_1$, and is situated on a transparent carrier substrate 12. The transmission grating includes splitting regions situated periodically with splitting period $TP_1$ along the indicated y-direction, which have different phase-shifting effects on the transmitted light. As illustrated in the top view of component 10 in FIG. 4b, another one-dimensional transmission grating is situated on carrier substrate 12 of component 10, in the x-direction, parallel adjacent to the transmission grating of splitting element 11: the second transmission grating functioning as merging element 13 in the present exemplary embodiment.

Scanning unit 20 includes at least one light source 21.1, one deflecting element 23.1 as well as a detector system 25.1. A laser or a laser diode, for example, may be used as light source 21.1, deflecting element 23.1 is arranged as a deflecting prism having a deflecting surface 23.1a, while detector system 25.1 is a so-called structured photodetector, which includes a plurality of periodically arranged light-sensitive detector regions.

Figure 4A:
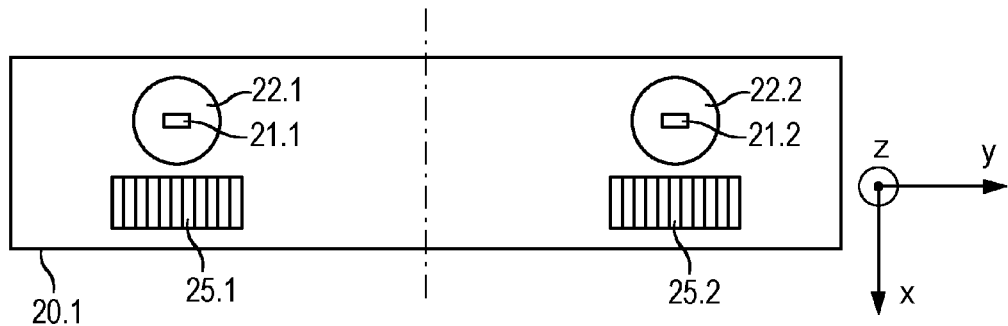
FIGS. 4a to 4c are plan views of different components of the example embodiment illustrated in FIG. 2.
Figure 4B:
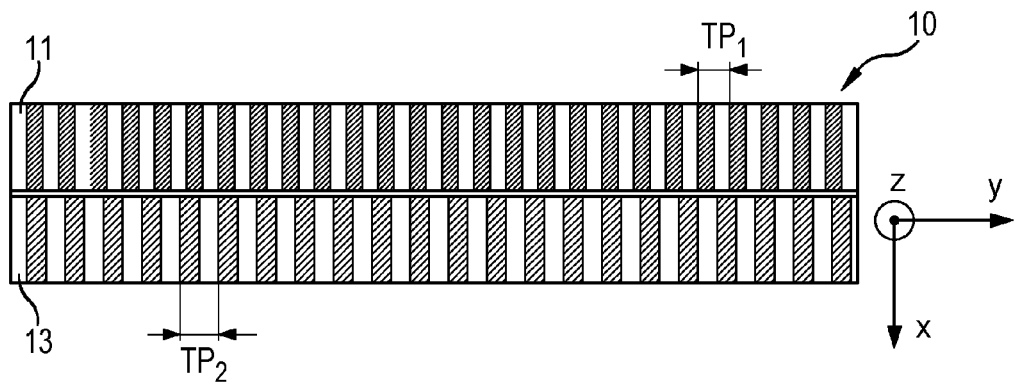
Figure 4C:
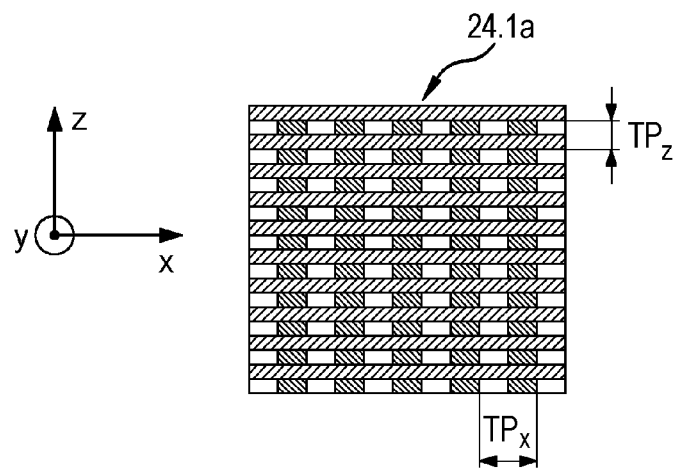

Furthermore, in the illustrated exemplary embodiment, a collimator optics 22.1 is provided in first partial scanning unit 20.1; a measuring standard 24.1 is furthermore situated in second partial scanning unit 20.2, which has a two-dimensional transmission cross grating 24.1a, which is situated on one side of a transparent carrier substrate 24.1c, while on the opposite side of the carrier substrate 24.1c parallel to transmission cross grating 24.1a a reflector 24.1b is situated; the transmission cross grating 24.1a and the reflector 24.1b being situated perpendicular in relation to the transmission grating of splitting element 11. As illustrated in FIG. 4c, transmission cross grating 24.1a has the splitting period $TP_x$ along the x-direction and the splitting period $TP_z$ along shifting direction z.

In the illustrated exemplary embodiment, identical components to the above-mentioned elements of scanning unit 20 are situated in the right part of scanning unit 20 in mirror symmetry relative to a plane of symmetry $S_E$, namely, a second light source 21.2, a second collimator optics 22.2, a second detector system 25.2, a second deflecting element 23.2 as well as a second measuring standard 24.2. In relation to the left optical scanning path, the relevant distance sensor will be referred to below as a first distance sensor, while in relation to the right optical path, the respective distance sensor will be referred to as a second distance sensor.

Figure 2:
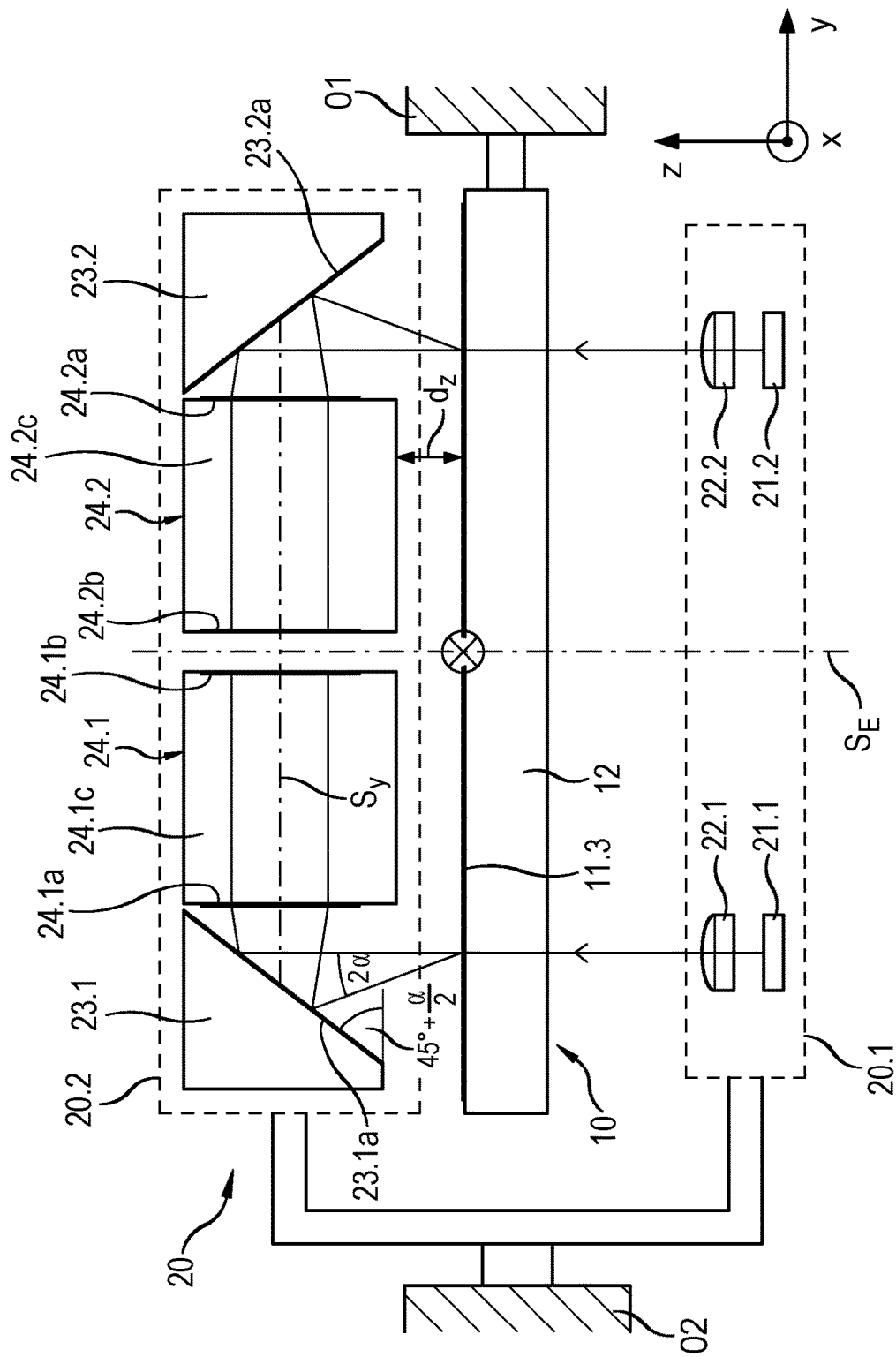
FIG. 2 is a schematic view including the optical path of a device according to an example embodiment of the present invention.
Figure 3A:
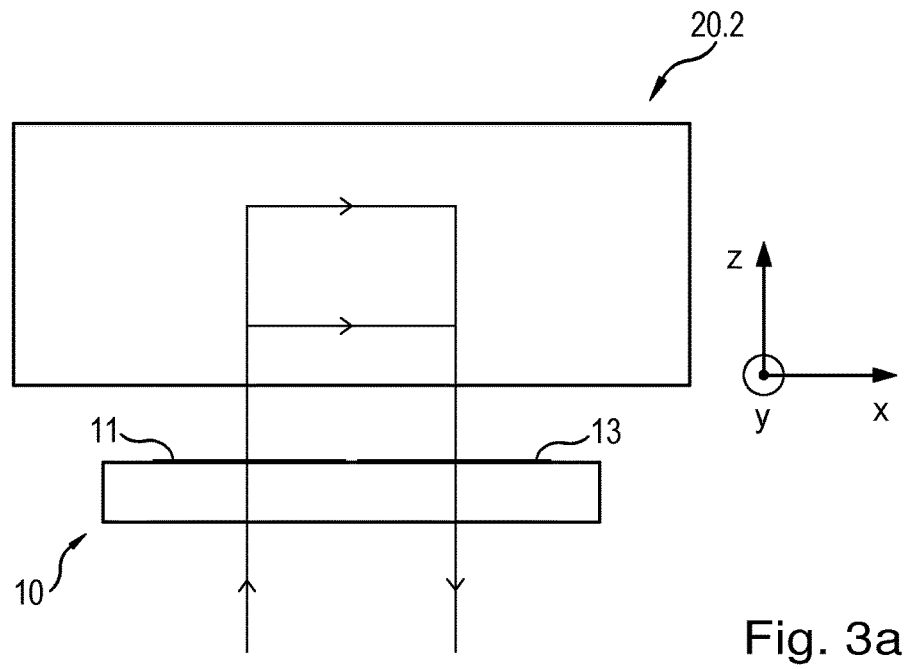
FIGS. 3a and 3b are schematic cross-sectional for explaining the course of the optical path in the example embodiment illustrated in FIG. 2.
Figure 3B:
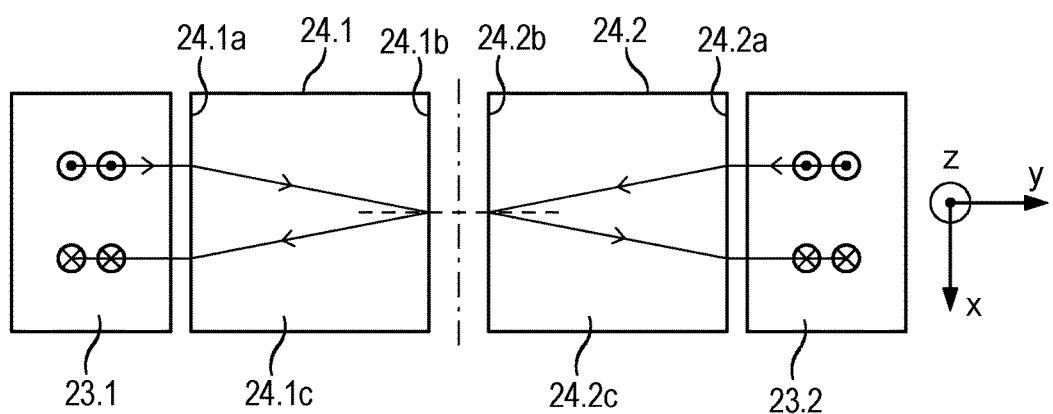

In the present, first exemplary embodiment, a first measured distance value $d_{z1}$ is thus generated via the elements situated on the left in FIG. 2, i.e. via the first distance sensor, and a second measured distance value $d_{z2}$ is generated via the elements situated on the right, i.e. the second distance sensor.

In the following, the optical path for generating the distance-dependent signals in the first exemplary embodiment are explained. This is explained with reference to the optical scanning path of the first distance sensor illustrated on the left in FIG. 2; the optical scanning path in the right part of the device, i.e. in the second distance sensor, being in principle identical.

The beam of rays emitted by light source 21.1 is first collimated via the upstream collimator optics 22.1, then leaves the partial scanning unit 20.1 and strikes splitting element 11 in component 10. There the beam is split into two partial beams in that the incident beam is diffracted at the transmission grating into the 0th and −1st order of diffraction. The partial beams then propagate in the second partial scanning unit 20.2 in the direction of deflecting element 23.1 and undergo at its deflecting surface 23.1a a reflection or deflection in the direction of measuring standard 24.1. There the two partial beams first pass through transmission cross grating 24.1a, respectively undergoing in the process a deflection in the z-direction and the x-direction, i.e. perpendicular to the drawing plane in FIG. 2; the resulting deflection in the x-direction being illustrated in the top view representation of the optical paths in FIG. 3b. Thereupon, the two partial beams, having passed carrier substrate 24.1c, strike reflector 24.1b of the measuring standard 24.1, via which they are reflected back in the direction of transmission cross grating 24.1a. In the repeated traversal of transmission cross grating 24.1a, the partial beams are once more deflected in the z-direction and the x-direction such that they then propagate onward to deflecting element 23.1 offset in parallel with respect to the direction of incidence. The offset of the partial beams entering and leaving measuring standard 24.1 in the x-direction is necessary in order to separate the illumination beams and signal beams spatially so as to be able to detect the latter. Between the first and the second incidence of the split partial beams on deflecting surface 23.1a of deflecting element 23.1, i.e. at least in a portion of the optical path, the partial beams extend symmetrically with respect to an axis of symmetry $S_y$ of partial scanning unit 20.2. Via deflecting element 23.1, the partial beams are then deflected at deflecting surface 23.1a in the direction of the merging location in component 10, where the partial beams are brought to interference by superimposition. The merging location is found in component 10 offset in the x-direction with respect to the splitting location on merging grating 13. In the present exemplary embodiment, splitting period $TP_1$ of the transmission grating of splitting element 11 is selected to be slightly different from splitting period $TP_2$ of the transmission grating of merging element 13. Following the passage of the superimposed partial beams through the merging grating, a so-called Vernier strip pattern results in this manner, which is able to be converted into distance-dependent, phase-shifted signals with the aid of the structured photodetector of detector system 25.1; and from these in turn the first measured distance value $d_{z1}$ may be obtained in the first distance sensor in a, e.g., conventional manner.

Via the fundamentally analog optical path, the second measured distance value $d_{z2}$ is generated in the second distance sensor, that is, in the right portion of the illustrated device. Accounting for the measured distance values $d_{z1}$, $d_{z2}$ of the first and second distance sensors, which are obtained from the respective optical paths in the device, it is possible to generate a resulting position phase Φ, which may be unequivocally assigned to a change of distance Δz between the two objects O1, O2 along the shifting direction z, in accordance with $$z = (d_{z1} + d_{z2})/2 \qquad\qquad \text{(eq. 3)}$$
$$= (TP_z)^2 \cdot \Phi / (2\lambda \cdot 2\pi)$$

where:
z:=measured distance value regarding the distance of objects O1, O2
$d_{z1}$:=measured distance value of the first distance sensor
$d_{z2}$:=measured distance value of the second distance sensor
$TP_z$:=splitting period of the transmission cross grating along the shift direction z
Φ:=position phase
λ:=wavelength of the light source In the present, first exemplary embodiment, the defined setting of the traversed path lengths of the partial beams between splitting and recombination occurs by the suitable selection of the angle of arrangement of deflection surfaces 23.1a, 23.2a of deflection elements 23.1, 23.2; this angle being chosen such that for arbitrary distances between the two objects O1, O2, the traversed path lengths between the splitting location and the merging location are identical.

In this exemplary embodiment, multiple phase-shifted, distance-dependent signals are generated via a so-called Vernier scanning process, i.e., via the generation of a strip pattern and the scanning of the same using a structured photodetector. Alternatively, generating the phase-shifted signals via a polarization evaluation or via a suitable arrangement of the merging element is also possible. Regarding the fundamentally known possibilities for generating phase-shifted, distance-dependent signals in interferential distance measuring devices, reference is made to German Published Patent Application No. 10 2011 005 937, for example, which is expressly incorporated herein in its entirety by reference thereto.

A variant of the first exemplary embodiment is illustrated in partial views in FIGS. 5, 6a, 6b, 7a and 7b. Only relevant differences with respect to the previously described exemplary embodiment are explained below.

Figure 5:
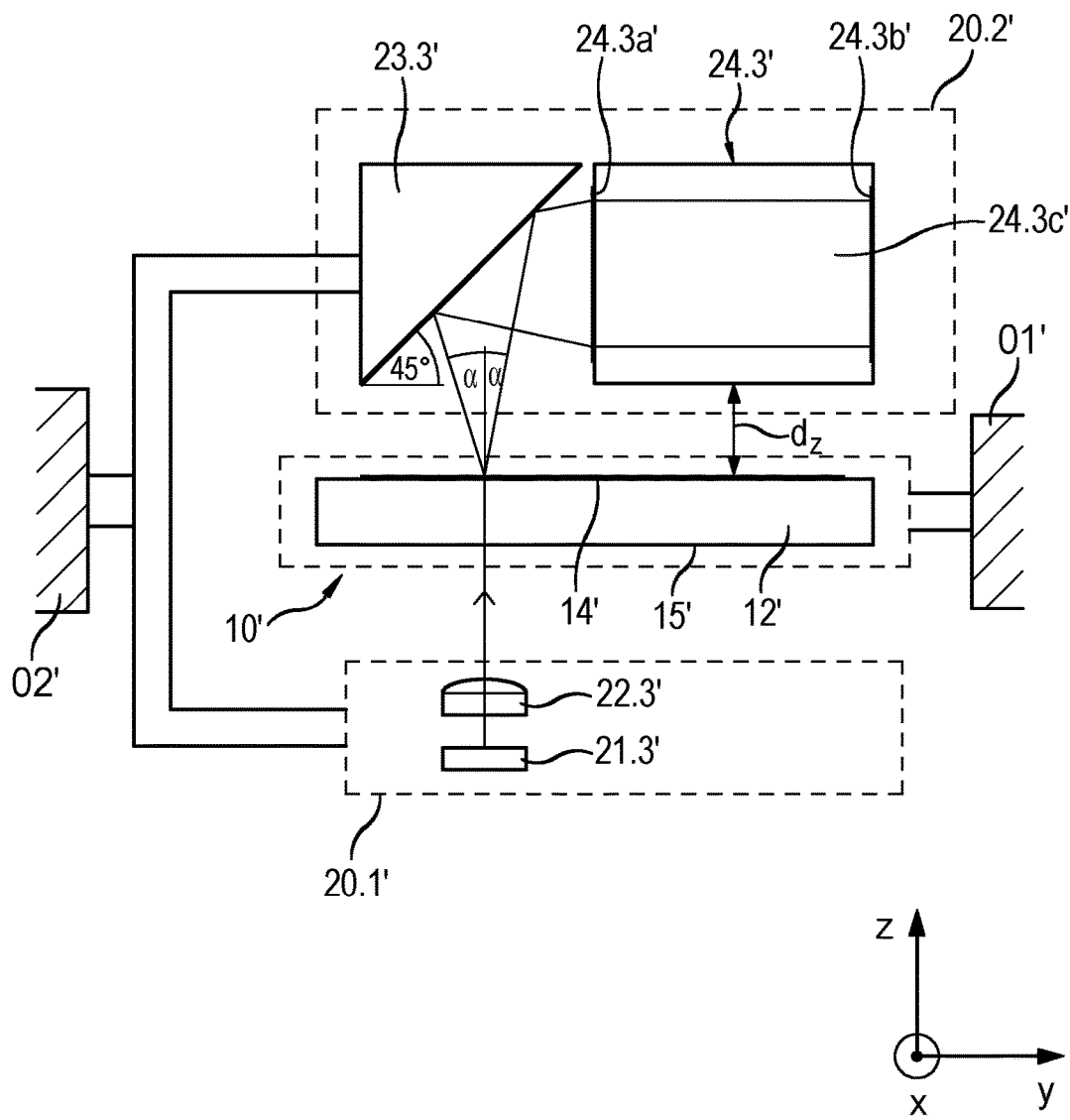
FIG. 5 schematically illustrates the optical path in a variant of the example embodiment illustrated in FIG. 2.
Figure 6A:
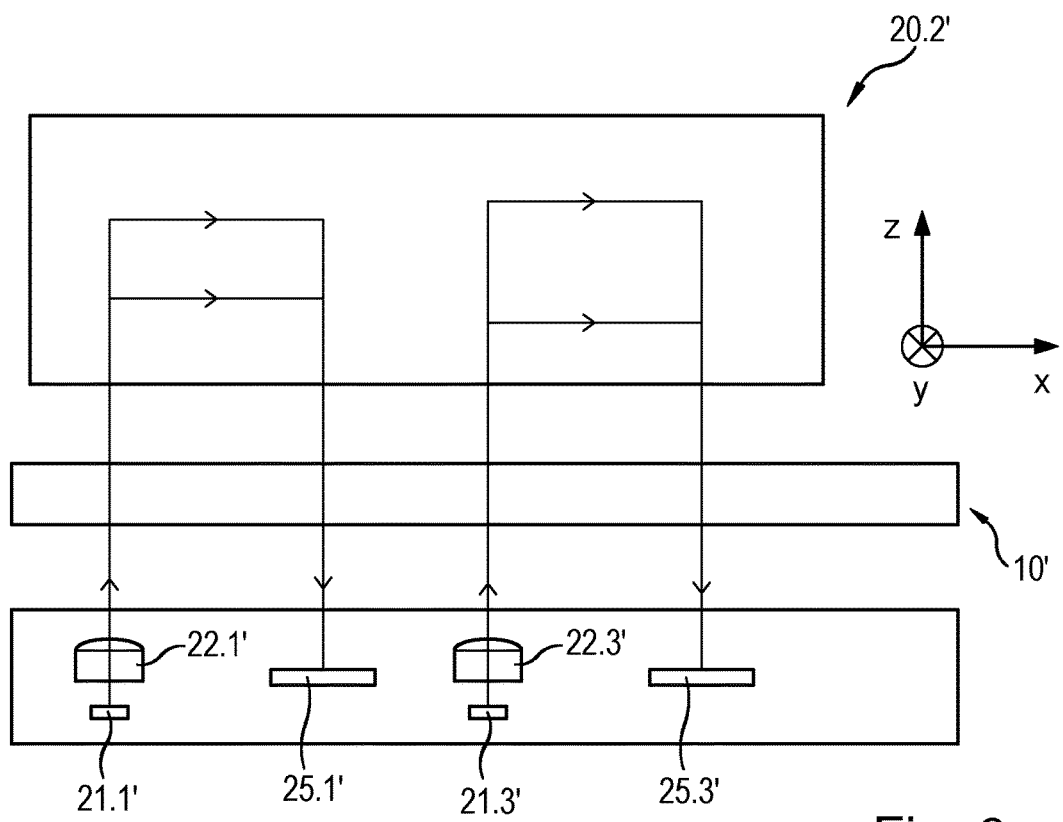
FIGS. 6a and 6b are schematic cross-sectional view for explaining the course of the optical path in the variant illustrated in FIG. 5.
Figure 6B:
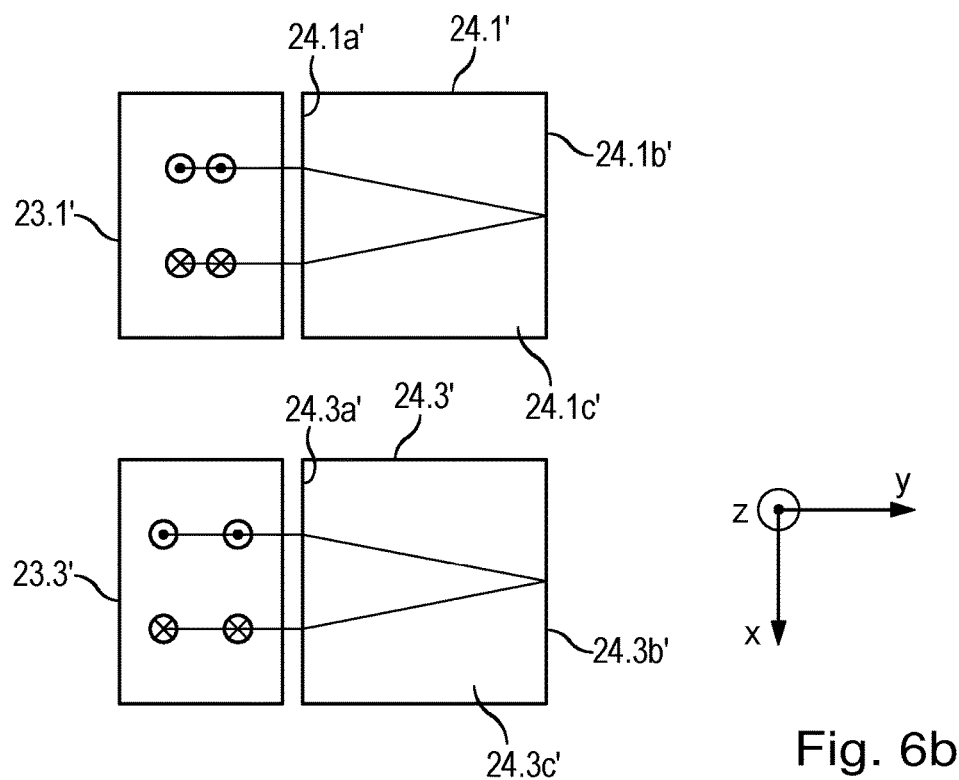

This variant includes a first distance sensor having a design or optical path, as is illustrated in the first described exemplary embodiment in the left portion in FIG. 2. This first distance sensor is complemented in the present variant by a second distance sensor, which however is offset in the x-direction with respect to the first distance sensor. On the side of the second distance sensor, the +/−1st orders of diffraction are used for signal generation at splitting element 14'. FIG. 5 illustrates only the second distance sensor in a schematic representation; it being possible to see the optical paths of the partial beams in the two distance sensors in the views of FIGS. 6a and 6b. Since these optical paths fundamentally correspond to those from the first exemplary embodiment, a new detailed description of the same is omitted.

Figure 7A:
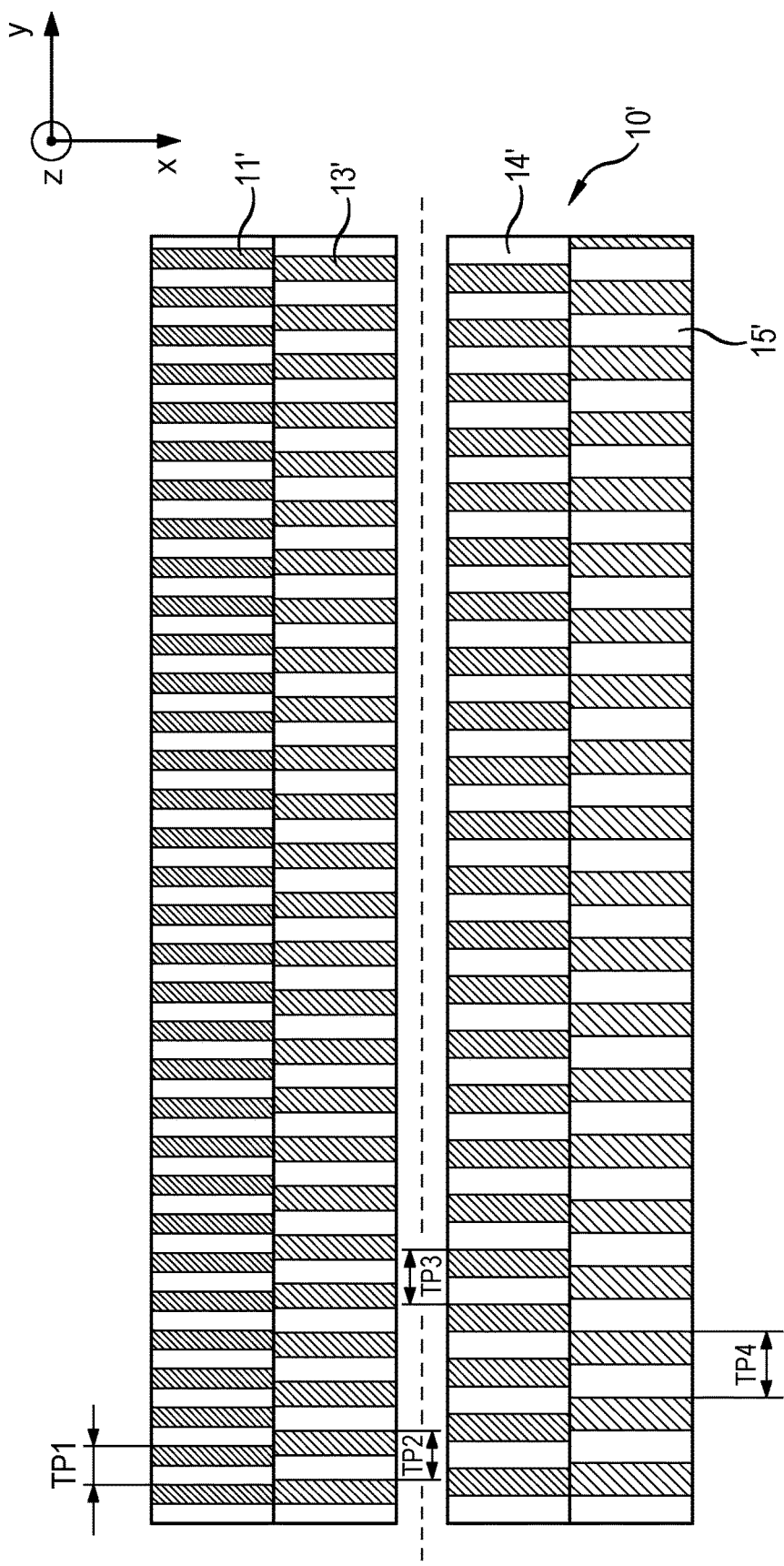
FIGS. 7a and 7b are top views of different components of the variant illustrated in FIG. 5.
Figure 7B:
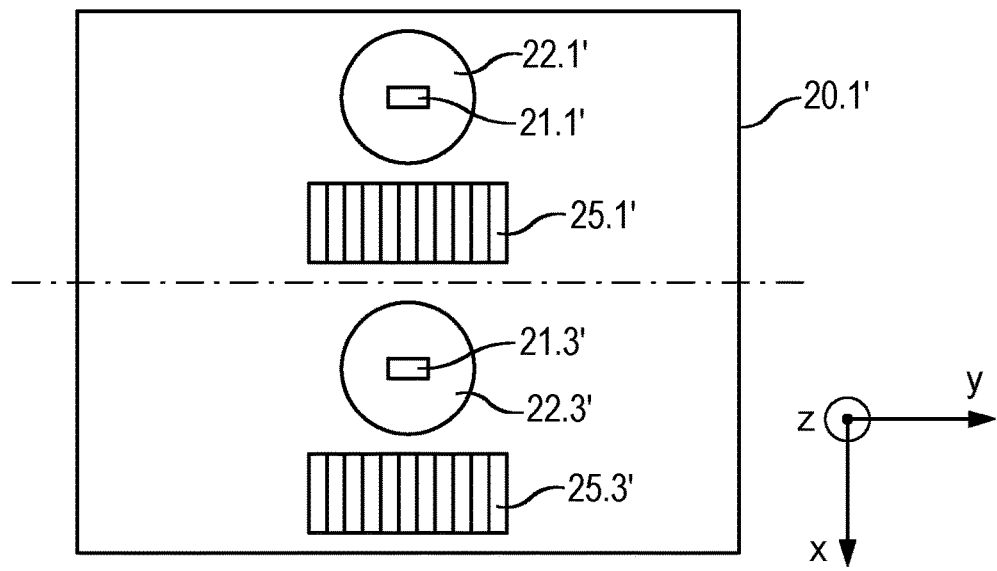

FIG. 7a furthermore illustrates the positions of the splitting elements 11', 14' and of the merging elements 13', 15' of the first and second distance sensors, which are adjacent in the x-direction. FIG. 7b illustrates the position of various components of the first and second distance sensors in partial scanning unit 20.1', that is, light sources 21.1', 21.3', collimator optics 22.1', 22.3' and detector systems 25.1', 25.3' for the two distance sensors.

Figure 8:
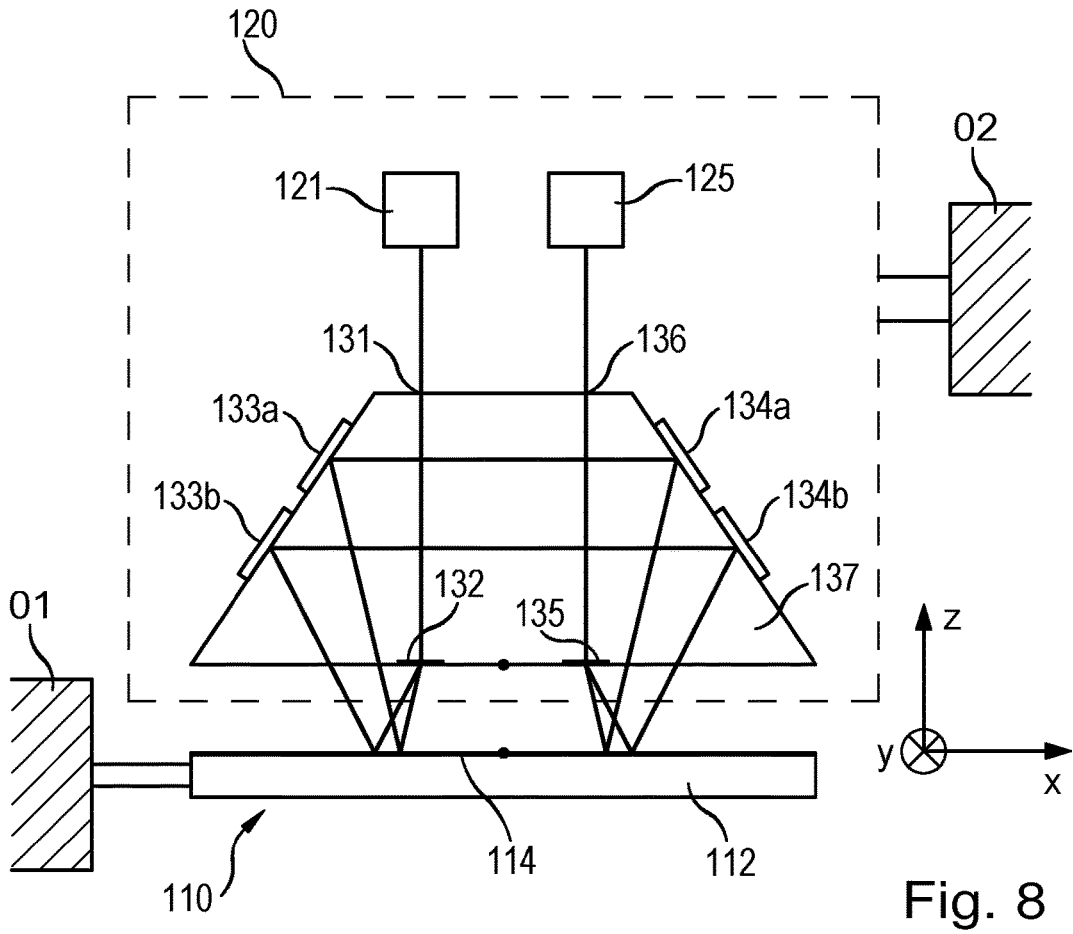
FIG. 8 schematically illustrates a device according to another example embodiment of the present invention.
Figure 9A:
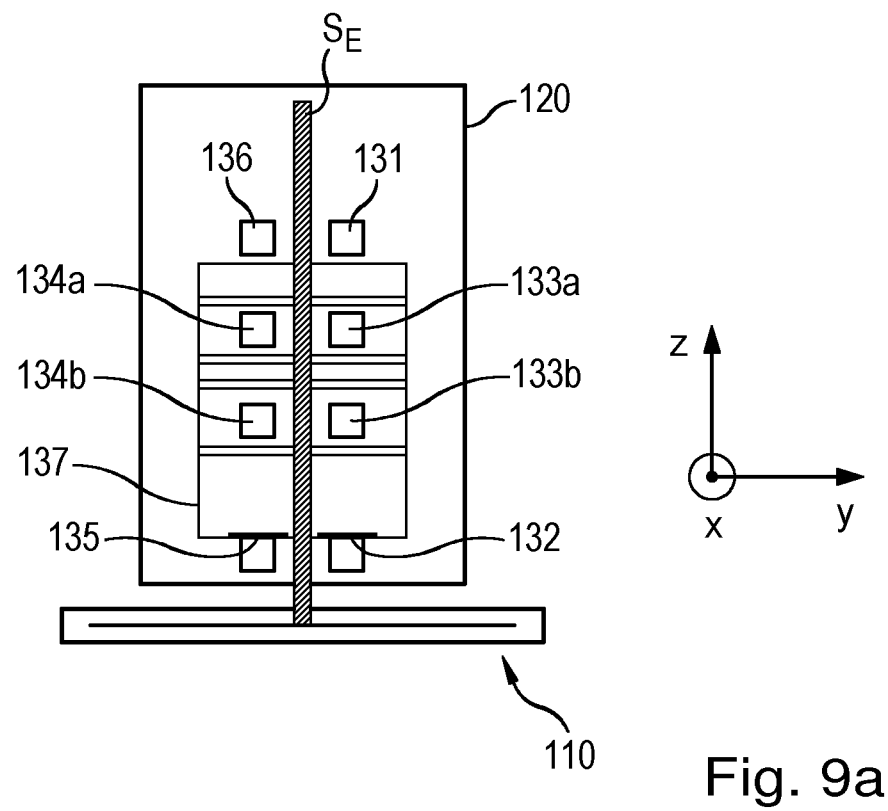
FIGS. 9a and 9b schematically illustrate the device illustrated in FIG. 8 from different perspectives.
Figure 9B:
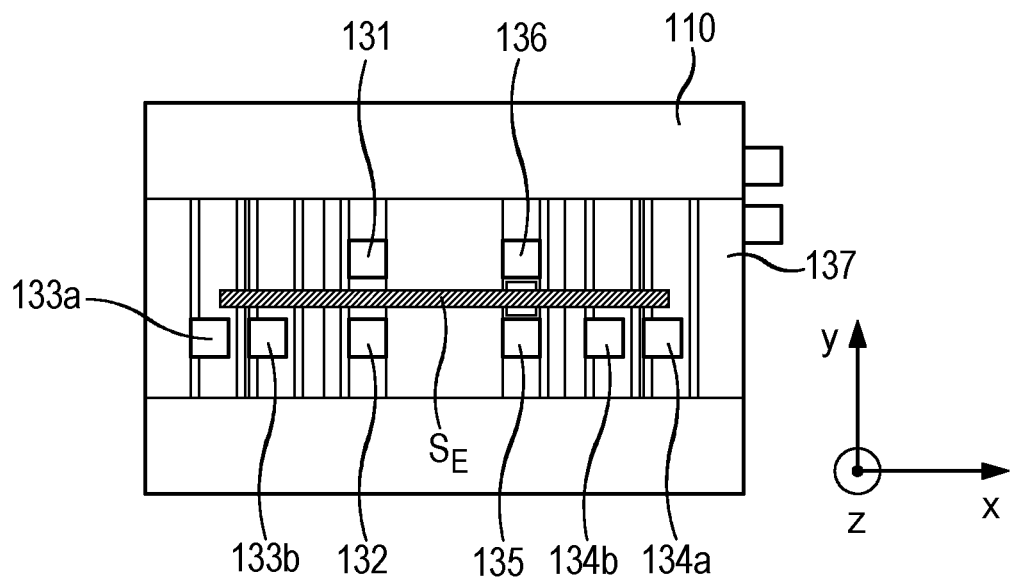
Figure 10:
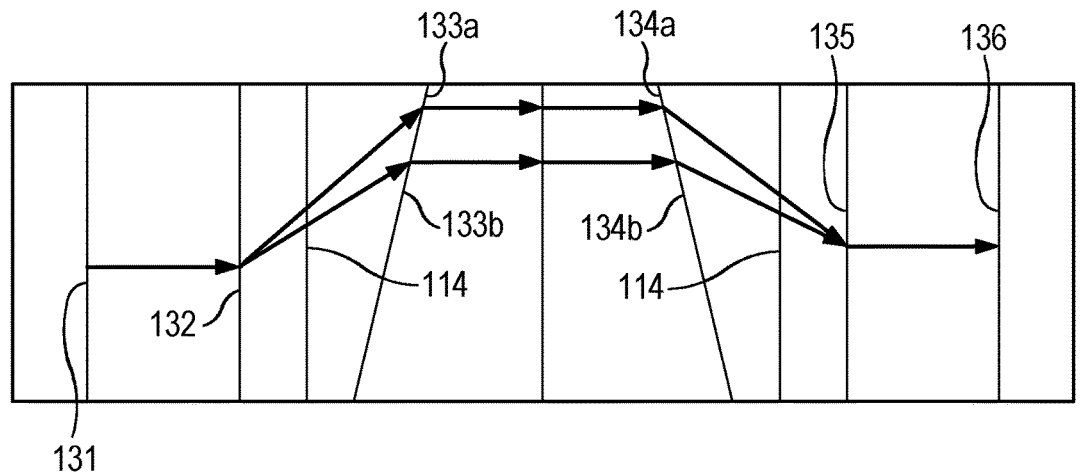
FIG. 10 is an elongated representation of the relevant optical paths in the device illustrated in FIG. 8.
Figure 11:
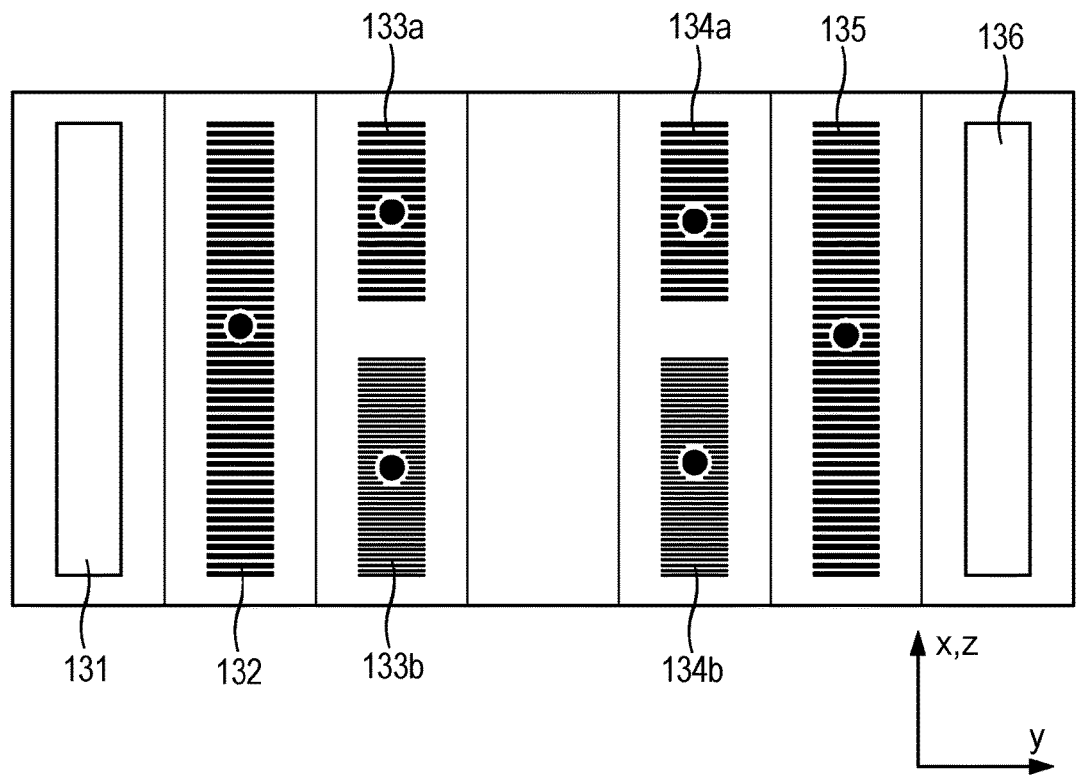
FIG. 11 is a top view of various components of the scanning unit of the device illustrated in FIG. 8.

Due to the provided use of the +/−1st orders of diffraction, the second distance sensor of this variant provides no phase shift in the event of a relative shift of objects O1, O2 along the shifting direction z; rather, it detects a phase shift in the event of a relative motion of objects O1, O2 along the y-direction. That is to say, a measured value regarding a position change of objects O1, O2 along the y-direction is available. The actually desired, additional measured value for a change of distance of objects O1, O2 along shifting direction z, however, may be ascertained via a subtraction of the position phases of the first and second distance sensors. A distance change Δz in the event of a relative motion of objects O1, O2 along the shifting direction z is obtained approximately as follows:

$$\Delta z = ((TP_z)^2/2\lambda) \cdot (\Phi_1/2\pi - K \cdot \Phi_2/4\pi) \qquad (\text{eq. 4})$$

where:
Δz:=change of the distance of objects O1, O2 along the shifting direction z
$TP_z$:=splitting period of the transmission cross grating along the shift direction z
λ:=wavelength of the light source
$\Phi_1$:=position phase of the first distance sensor
$\Phi_2$:=position phase of the second distance sensor
K:=ratio of the splitting periods of the splitting elements or transmission gratings of the second to the first distance sensor A second exemplary embodiment is explained below with reference to schematic FIGS. 8, 9a, 9b, 10 and 11. FIGS. 8, 9a and 9b illustrate different views of the corresponding device, FIG. 10 illustrates the optical paths for generating the distance-dependent signals in an extended view, and FIG. 11 is a top view of various optically functionally relevant elements that are impinged upon in the optical paths. Again, only the relevant differences with respect to the previously described exemplary embodiments are explained below.

To detect the distance of the two objects O1, O2 along the again vertical shifting direction z, the second exemplary embodiment includes a measuring reflector 110, which is connected to an object O1, and a scanning unit 120, which is connected to an object O2.

Measuring reflector 110 includes a carrier substrate 112 on which a plane reflector 114 is situated. The reflecting side of plane reflector 114 is oriented in the direction of scanning unit 120.

On the side of scanning unit 120, a light source 121, a detector system 125 and a transparent carrier body 137, e.g. made of glass, are provided. Alternatively, a suitable hollow body could also be used as a carrier body. As illustrated in FIG. 8, carrier body 137 has a truncated pyramid-shaped cross section; a series of optically functionally relevant elements being situated on carrier body 137. These elements include a splitting element 132 situated on the surface of carrier body 137 facing measuring reflector 110 and a merging element 135 as well as four deflecting elements 133a, 133b, 134a, 134b situated on the lateral surfaces of the carrier body; a first deflecting element 133a and a second deflecting element 133b being situated on the left lateral surface of carrier body 137 in FIG. 8 and a third deflecting element 134a and a fourth deflecting element 134b being situated on the right lateral surface of carrier body 137. Splitting element 132, like merging element 135, is also arranged as a transmission grating having determinately chosen splitting periods. In this exemplary embodiment, reflection gratings having suitably chosen splitting periods are used as deflecting elements 133a, 133b, 134a, 134b, their reflecting surfaces being oriented in the direction of the interior of carrier body 137.

The optical path of the second exemplary embodiment is explained below. In this instance, the beam of rays emitted by light source 121 first passes through an optically inactive region 131 of the side of carrier body 137 that is facing light source 121. After passing through carrier body 137, the beam strikes a splitting location on splitting element 132 and is split into two partial beams, which propagate onward at different angles in the direction of measuring reflector 110, as illustrated in FIG. 8, and impinge a first time upon the latter on first impact locations. The partial beams are reflected back on plane reflector 114 of measuring reflector 110 in the direction of scanning unit 120, namely, in the direction of first deflecting element 133a and second deflecting element 133b. From these deflecting elements 133a, 133b, the partial beams are then deflected in the direction of third deflecting element 134a and fourth deflecting element 134b. The partial beams are deflected via third and fourth deflecting elements 134a, 134b in the direction of plane reflector 114 of measuring reflector 110, upon which the partial beams impinge a second time on two impact locations. The second impact locations on plane reflector 114 may be offset with respect to the first impact locations of the partial beams in the indicated x-direction. From second impact locations 114, the partial beams are finally reflected back to a merging location on merging element 135. From merging element 135, a superimposed pair of interfering partial beams finally propagates through carrier body 137, leaves the latter through optically inactive region 136 and reaches detector system 125. The detector system is in turn able to detect multiple phase-shifted, distance-dependent signals.

In this exemplary embodiment, different variants may also be used to generate the plurality of phase-shifted signals. Thus it is possible, for example, to provide a so-called Vernier scanning process, in which the transmission grating of splitting element 132 has a slightly different splitting period than the transmission grating of merging element 135. The resulting fringe pattern may be detected by a structured photodetector in detector system 125 and converted into multiple distance-dependent, phase-shifted signals. Alternatively, as above, generating the phase-shifted signals via a polarization evaluation or via a suitable arrangement of the merging element is also possible. Regarding the fundamentally known possibilities for generating phase-shifted, distance-dependent signals in interferential distance measuring devices, reference is made again to German Published Patent Application No. 10 2011 005 937.

The second exemplary embodiment may ensure that, in the event of a change of distance along the shifting direction z, the traversed optical path lengths of the partial beams between splitting and recombination remain the same for both partial beams and that thus the required wavelength-independence of the distance measurement is guaranteed. This is ensured, on the one hand, by the angles at which the provided four deflecting elements 133a, 133b, 134a, 134b are arranged, which are suitable chosen. On the other hand, a symmetrical course of the split partial beams at least in a portion of the optical path is ensured via the arrangement of the reflection gratings of deflecting elements 133a, 133b, 134a, 134b, particularly by the selection of the splitting periods of these reflection gratings.

An advantage of the second exemplary embodiment is that it results in insensitivity with respect to possible tilting about the y-axis due to the provided symmetry with respect to the yz-plane.

Figure 12:
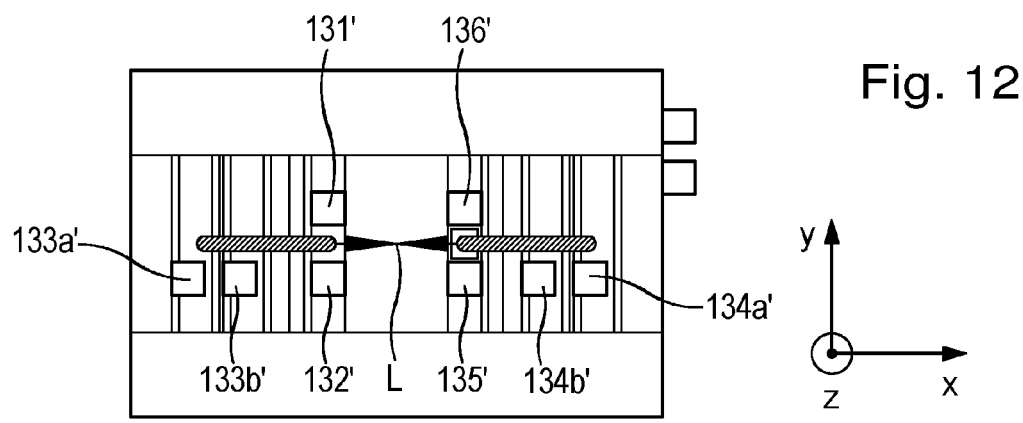
FIG. 12 schematically illustrates a variant of the device illustrated in FIG. 8.
Figure 13:
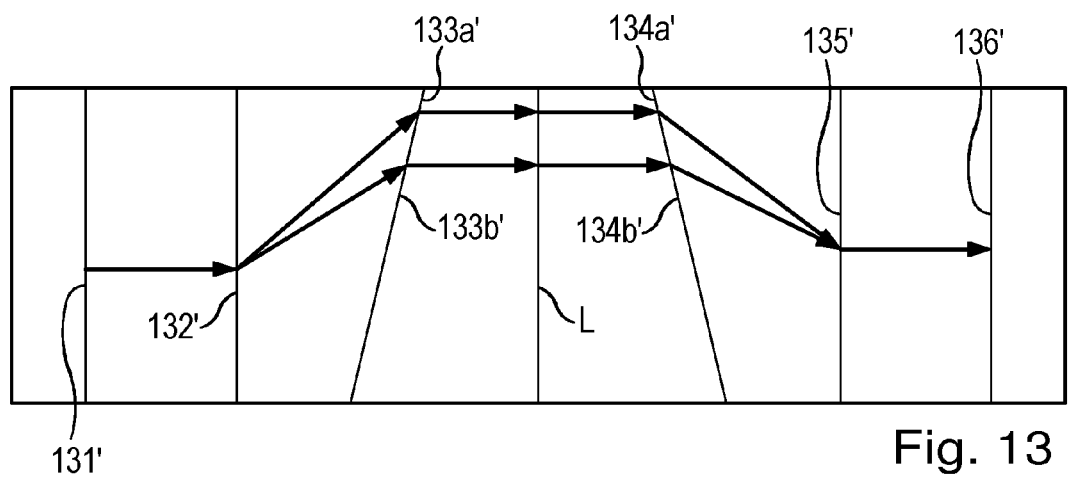
FIG. 13 is an elongated representation of the relevant optical paths in the variant of the device illustrated in FIG. 8.
Figure 14:
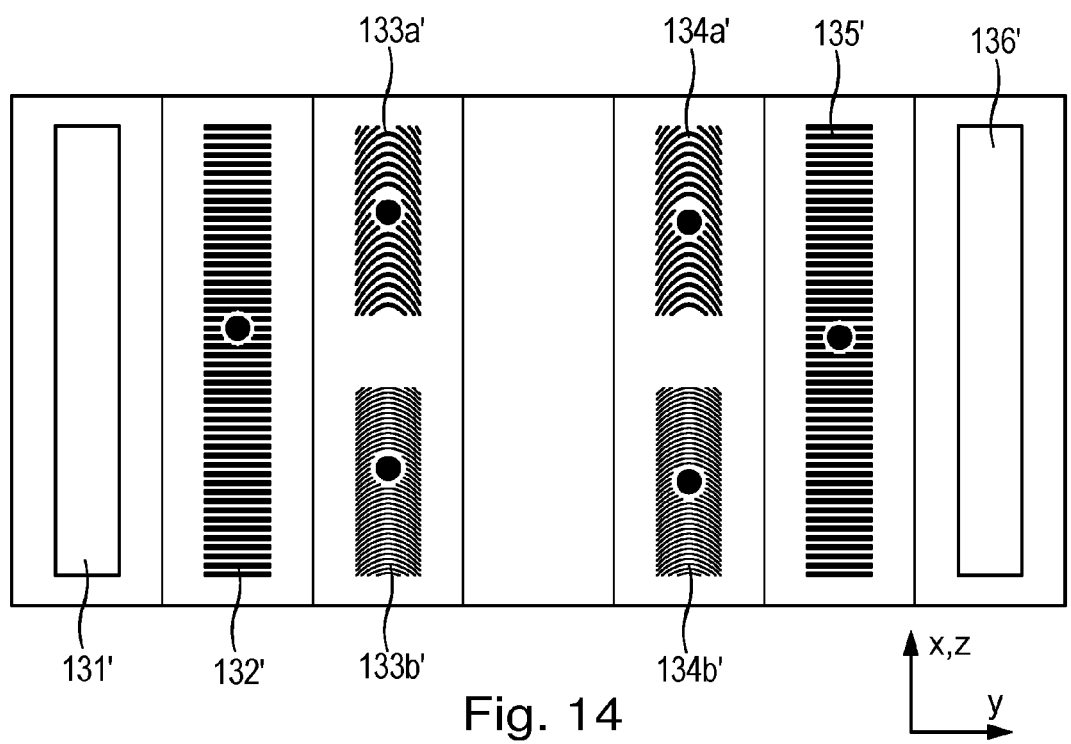
FIG. 14 is a top view of various components of the scanning unit of the device illustrated in FIG. 8.

Finally, one variant of the second exemplary embodiment is explained with reference to FIGS. 12, 13 and 14. As before, only the relevant differences with respect to the just described second exemplary embodiment shall be mentioned.

Thus, the optical path for generating the distance-dependent signals is in this variant fundamentally identical to that of the second exemplary embodiment illustrated in FIGS. 8 to 11. By contrast, there is only a provision for the partial beams propagating in the scanning unit between striking the first and second deflecting elements 133a', 133b' and striking the third and fourth deflecting elements 134', 134b' to be focused on a line focus L extending along the z-direction. For this purpose, a corresponding arrangement of the deflecting elements 133a', 133b', 134a', 134b' is provided in the form of reflecting cylindrical lenses that are situated on the lateral surfaces of the carrier body. In addition to the deflecting optical effect on the partial beams according to the previously explained exemplary embodiment, deflecting elements 133a', 133b', 134a', 134b' or the cylindrical lenses also have a focusing effect in the y-direction, resulting in a line focus L in a center of symmetry of the scanning unit. In this manner, insensitivity is achieved to possible tilting about the x-axis, in addition to the already existing invariance in the event that components of the device tilt about the y-axis. That is to say, in the event of a possible tilting of components of the device about one of these axes, no errors occur in determining the distance.

As an alternative to the use of reflecting cylindrical lenses, such a focusing effect could also be achieved by refractive lenses additionally placed in the optical paths.

Such insensitivity against tilting about the y-axis and the x-axis may also be ensured in a further alternative arrangement of the second exemplary embodiment. Thus, instead of the design of the four deflecting elements in the form of reflecting cylindrical lenses, there may also be a provision for the split partial beams in the scanning unit respectively to strike a total of three deflecting elements before being recombined, a total of six deflecting elements consequently being provided for the split partial beams. For this purpose, reflection gratings act as deflecting elements, which are situated on the lateral surfaces of a carrier body, which is arranged as a three-sided truncated pyramid. Such a system corresponds to a beam inversion as may be analogously implemented using a refractive triple prism. An advantage of this variant over the previously explained variant is that all of the gratings used may be provided as having constant splitting periods.

The invention claimed is:

1. A device for interferential distance measurement between two objects movable with respect to each other along at least one shifting direction, comprising:
    at least one light source;
    at least one splitting element adapted to split a beam of rays emitted by the light source at a splitting location into at least two partial beams that propagate onward at different angles;
    at least one deflecting element adapted to deflect the partial beams striking it in a direction of a merging location, where the split partial beams are interferingly superimposed and where optical paths of the partial beams between the splitting location and the merging location are adapted such that traversed optical path lengths of the partial beams between the splitting location and the merging location are identical in the event of a change of distance between the two objects; and
    at least one detector system adapted to detect distance-dependent signals from the superimposed pair of interfering partial beams.

2. The device according to claim 1, wherein a first one of the two objects is connected with at least one scanning unit, which includes at least one light source, at least one detector system, and at least one first deflecting element, and a second one of the two objects is connected either with a measuring reflector or with a splitting element.

3. The device according to claim 2, wherein the partial beams in the scanning unit propagate symmetrically, at least in a portion of the optical path, with respect to at least one axis of symmetry of the scanning unit.

4. The device according to claim 2, wherein either (a) the scanning unit includes two partial scanning units situated in mirror symmetry with respect to a mirror plane oriented parallel to the shifting direction or (b) in the case of a single utilized scanning unit, the scanning unit is arranged in mirror symmetry with respect to a mirror plane oriented parallel to the shifting direction.

5. The device according to claim 1, wherein the position and/or arrangement of the at least one deflecting element ensure that the traversed optical path lengths of the partial beams between the splitting location and the merging location are identical in the event of a change of distance between the two objects.

6. The device according to claim 2, wherein the splitting element is arranged as a one-dimensional transmission grating and the scanning unit includes at least one first measuring standard, which has a two-dimensional transmission cross grating and a reflector arranged parallel to it.

7. The device according to claim 6, wherein the transmission cross grating and the reflector are arranged perpendicularly with respect to the transmission grating of the splitting element.

8. The device according to claim 6, wherein the deflecting element includes a deflecting prism.

9. The device according to claim 6, wherein:
the beam of rays emitted by the light source is split into two partial beams at the splitting element and the two partial beams propagate in the direction of scanning unit;
in the scanning unit, the partial beams are deflected via the deflecting element in the direction of the measuring standard;
the partial beams passing through the transmission cross grating of the measuring standard, are deflected and then strike the reflector;
a reflection occurs from the reflector back in the direction of the transmission cross grating, where after a new transmission through the transmission cross grating another deflection results such that the partial beams propagate in a parallel offset manner with respect to the direction of incidence to the deflecting element;
the partial beams are deflected on the deflecting element in the direction of the merging location; and
the superimposed partial beams then propagate in the direction of the detector system.

10. The device according to claim 6, wherein the scanning unit includes a second deflecting element and a second measuring standard, which includes a two-dimensional transmission cross grating and a reflector, the second deflecting element and the second measuring standard being arranged in the scanning unit in mirror symmetry with respect to the first deflecting element and to the first measuring standard.

11. The device according to claim 2, wherein the scanning unit (120) connected with a first one of the objects includes at least four deflecting elements, each arranged as a one-dimensional reflection grating, and at least one splitting element, which is arranged as a one-dimensional transmission grating, and a measuring reflector is connected with a second one of the two object, which is arranged as a plane reflector.

12. The device according to claim 11, wherein the scanning unit includes a transparent carrier body having a truncated pyramid-shaped cross section, the splitting element being situated on a surface of the transparent carrier body facing the measuring reflector, and the at least four deflecting elements being situated on lateral surfaces of the transparent carrier body.

13. The device according to claim 11, wherein:
the beam of rays emitted by the light source is split into two partial beams at the splitting element and the two partial beams propagate in the direction of the measuring reflector;
a reflection of the partial beams occurs from the measuring reflector back in the direction of the first and second deflecting elements in the scanning unit, where the partial beams are deflected in the direction of the third and fourth deflecting elements; and
a deflection of the partial beams of rays to the measuring reflector occurs via the third and fourth deflecting elements;
from the measuring reflector, the partial beams are reflected back in the direction of the merging location in the scanning unit; and
the superimposed partial beams then propagate in the direction of the detector system.

14. The device according to claim 11, wherein the deflecting elements located in the scanning unit are configured to provide a focusing effect on the partial beams propagating in the scanning unit such that a line focus results in a center of symmetry of the scanning unit.

* * * * *